United States Patent [19]
Burckhalter

[11] Patent Number: 5,395,404
[45] Date of Patent: Mar. 7, 1995

[54] APPARATUS FOR PYROLYZING TIRES

[75] Inventor: Jerry Burckhalter, Leland, N.C.

[73] Assignee: The Jerrold Corporation, Leland, N.C.

[21] Appl. No.: 113,212

[22] Filed: Aug. 27, 1993

[51] Int. Cl.$^6$ .............................................. C10J 3/20
[52] U.S. Cl. ................................. 48/111; 110/229; 202/97; 202/98; 422/198; 422/201
[58] Field of Search ............................. 422/198–201, 422/208, 105, 108, 112, 113, 150, 242; 110/250, 229, 242; 219/635, 636, 638, 642, 643, 10.57, 10.61; 373/110, 29; 208/427; 425/28.1; 48/111; 585/240–241; 201/25; 202/97, 98, 91.38; 431/215; 126/96 A; 432/175

[56] References Cited

U.S. PATENT DOCUMENTS

| | | |
|---|---|---|
| 1,617,359 | 2/1927 | Westberg ................ 373/110 |
| 1,686,371 | 10/1928 | Fauser ................ 422/199 X |
| 2,131,753 | 10/1938 | Reid ................ 422/113 X |
| 2,569,468 | 10/1951 | Gaugler ................ 373/110 X |
| 2,930,825 | 3/1960 | Johnson ................ 373/110 |
| 3,174,474 | 3/1965 | Jones et al. ................ 126/91 A |
| 3,704,108 | 11/1972 | Alpert . | 
| 4,090,054 | 5/1978 | Heine et al. ................ 219/635 X |
| 4,235,676 | 11/1980 | Chambers . |
| 4,402,738 | 9/1983 | Akio ................ 75/445 |
| 4,507,174 | 3/1985 | Kutrieb ................ 202/97 |
| 4,588,477 | 5/1986 | Habib . |
| 4,613,408 | 9/1986 | Howard ................ 48/111 |
| 4,642,401 | 2/1987 | Coenen et al. . |
| 4,647,443 | 3/1987 | Apffel . |
| 4,686,008 | 8/1987 | Gibson . |
| 4,740,270 | 4/1988 | Roy . |
| 4,809,672 | 3/1989 | Kendall et al. ................ 126/91 A |
| 5,061,363 | 10/1991 | Farcasiu et al. . |
| 5,101,739 | 4/1992 | Nance et al. ................ 110/229 |
| 5,158,983 | 10/1992 | Stapp . |
| 5,167,772 | 12/1992 | Parker, Sr. . |
| 5,197,176 | 10/1992 | Munger . |
| 5,213,051 | 5/1993 | Kaneko ................ 110/229 |
| 5,323,714 | 6/1994 | Cox ................ 110/229 |

Primary Examiner—Amalia L. Santiago
Attorney, Agent, or Firm—B. Craig Killough

[57] ABSTRACT

Whole tires are heated in a pressure vessel to a range of between 700° Farenheit and 900° Farenheit, with pressure within the vessel achieved and maintained at 100–300 pounds per square inch. The vessel has a heat tube which extends through the center of the tires contained therein to uniformly apply heat. The method produces a low sulfur oil and gas, and a useable coke product from the pryolysis of the tires.

8 Claims, 3 Drawing Sheets

APPARATUS FOR PYROLYZING TIRES

SUMMARY OF THE INVENTION

This invention relates to the pyrolyzing of used tires to reduce the rubber to solid, liquid and gas components.

BACKGROUND OF THE INVENTION

Used tires are an environmental problem of large proportion. The extremely large quantity of tires discarded each year makes burial in landfills undesirable. Tires take up a tremendous amount of landfill space, are difficult to keep buried, and do not decay.

Tires may be burned and used as a source of energy. However, the burning of tires creates additional environmental problems in the form of air pollution as a result of burning.

Tires may be liquified. However, the energy required for the liquification process of a tire is cost prohibitive. The liquification process also results in a change of the structure of the rubber which makes the rubber undesirable for many uses.

Various devices are found in the prior art for pyrolyzing tires. These devices use heat and relatively high pressures, or subatmospheric pressures. Some of the devices require the introduction of hydrogen into the pyrolisis process. Many of the devices require chopping of the tires, preheating of the tires or other preprocessing.

SUMMARY OF THE PRESENT INVENTION

The present invention provides a device into which whole tires may be inserted. Tires inherently have a round center void for mounting of the tire to wheel. The device of the present invention has a heating tube which is inserted through this center void as the tires are held within a vessel which allows the pressure within the vessel to be controlled.

Heat is applied to the heating tube. The tires are pyrolized at a temperature of 700° to 900° F. As the temperature rises within the vessel, the pressure within the vessel begins to rise. The pressure is allowed to rise to a range of between 100 and 300 p.s.i., at which point gas is bled from the vessel, and collected. The placement of the heating tube through the center of the tires allows a uniform and efficient application of heat to pyrolize the tires without the requirement of chopping or reducing tires in size, yet allows the pryolisis to take place in a relatively short period of time. The pryolisis yields three components: a solid, coke like material; a liquid, which is similar to fuel oil; and a gas. The particular range of temperatures and pressures chosen yields a gas which is extremely low in sulfur, and an oil component which has a relatively low sulfur component. The coke contains levels of sulfur which are favorable when compared to coke produced from many grades of coal.

DETAILED DESCRIPTION OF THE PREFERRED EMBODIMENT

Figure 1:
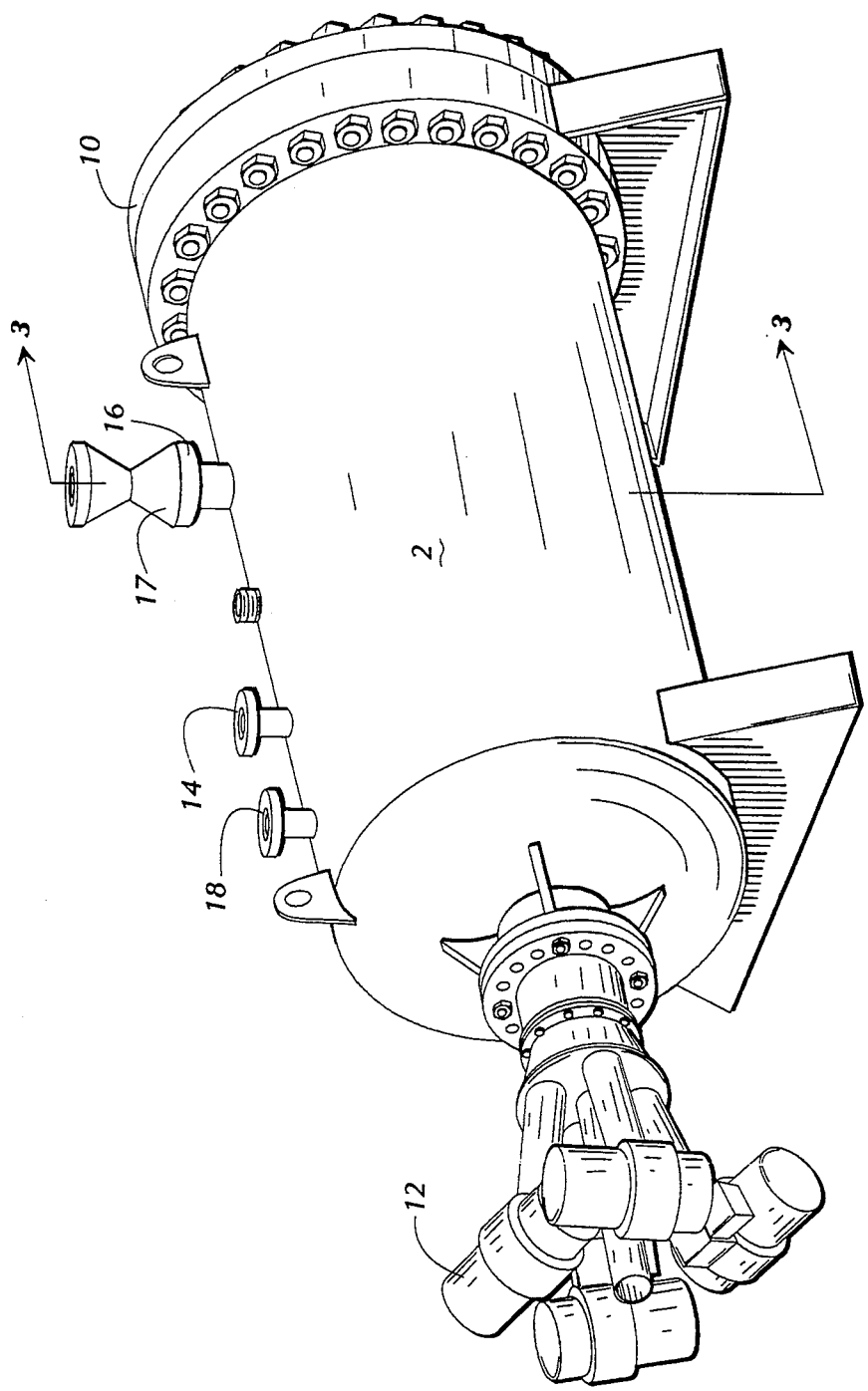
FIG. 1 is a perspective view of the device which pryolizes tires.
Figure 2:
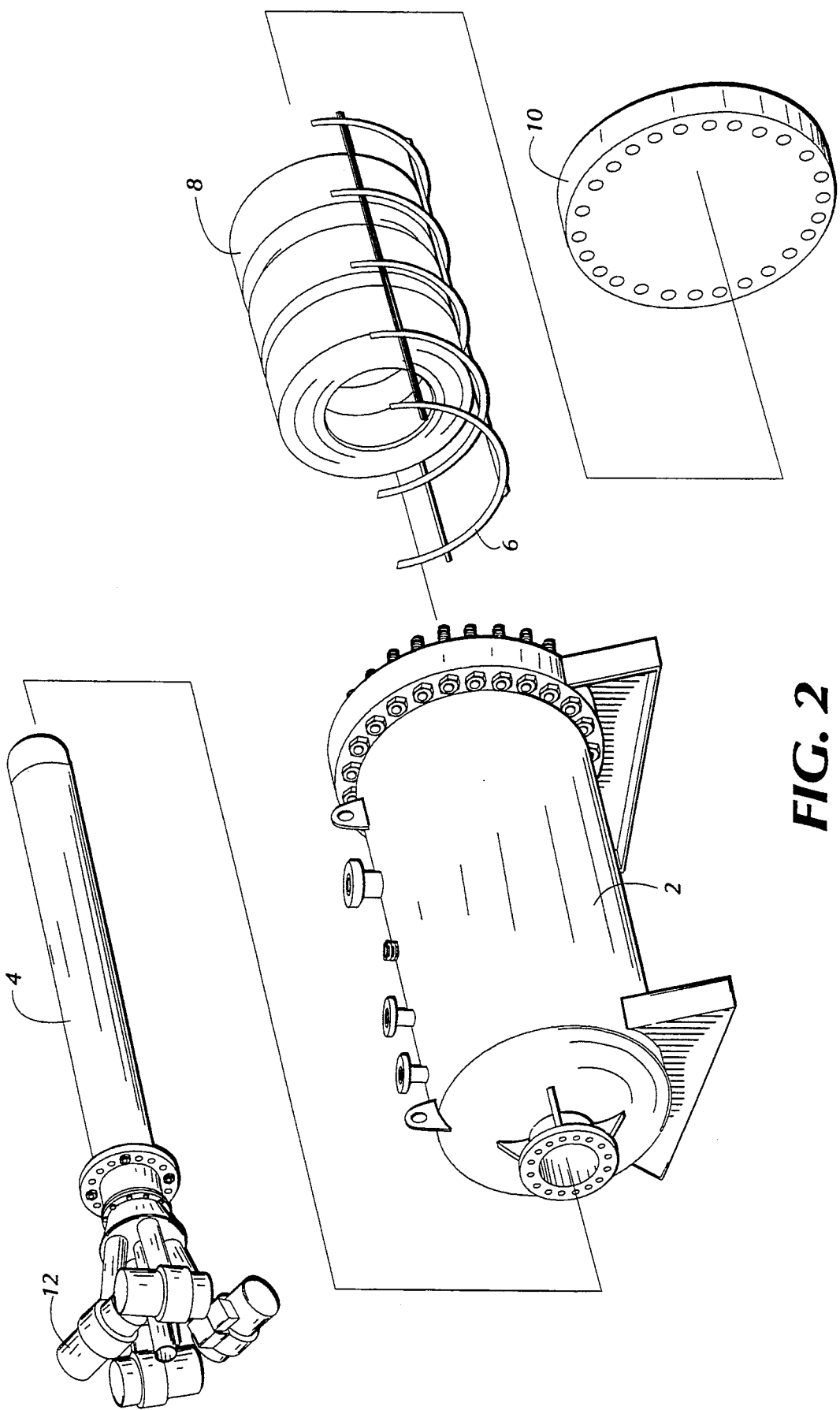
FIG. 2 is a exploded view of the device which pyrolize tires, showing the vessel 2, heating tube 4, carriage 6 containing tires 8, and a door 10.

Referring now to the drawing figures, the assembled vessel is shown in FIG. 1. FIG. 2 demonstrates the larger components of the device.

Figure 3:
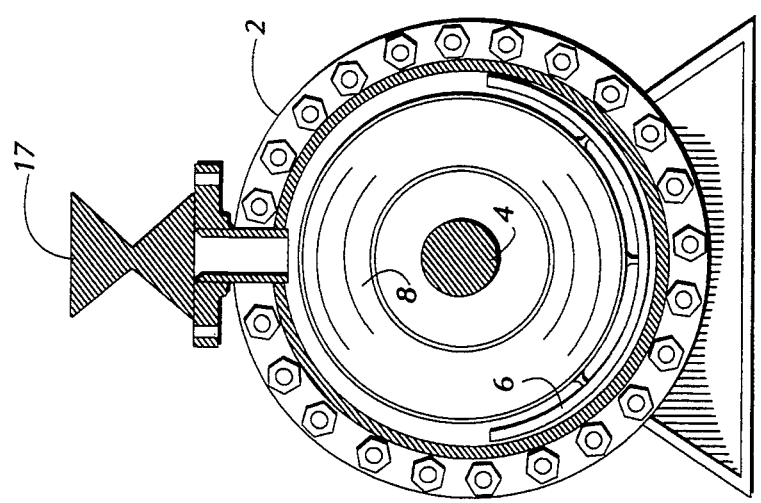
FIG. 3 is a sectioned view taken essentially along line 3—3 of FIG. 1.

It preferred that the vessel 2 is cylindrical in shape, FIG. 2, having a round or circular cross section, FIG. 3. Tires 8 are assembled in a carriage 6. The grouping of the tires forms a somewhat cylindrical shape. Accordingly, the interior of the vessel is a cylindrical void in the preferred embodiment. While the overall shape of the vessel could be of other configurations, the interior void will be large enough to receive the carriage containing tires, and will preferably have a round or circular cross-section.

A carriage 6 is provided in which tires 8 are placed. This carriage may be of any shape which will accept tires, and which is capable of insertion into the interior void of the vessel. However, the carriage may be a series of semi-circular members connected by longitudinal structures FIG. 2. Means, such as casters, may be provided for guiding or transporting the carriage into the void, however, such means should be able to withstand the temperatures necessary operation of the device.

Tires are placed on the carriage in a whole form, as they are typically discarded as used tires. It is not necessary to chop or otherwise reduce the used tires. It is preferable that the carriage hold multiple tires for optimal energy efficiency.

The carriage containing whole tires is inserted into the interior void of the vessel.

A heating tube 4 is present within the interior void of the vessel. The heating tube is longitudinally positioned within the vessel, from substantially one end of the vessel to the other end. As the tires are inserted by means of the carriage into the void, the center void of the tires allows the tires to surround the heating tube. Tires inherently have such a center void which allows tires to be mounted to a wheel. Accordingly, used tires will in all cases have present a void through which the heating tube will be present.

The heating tube emits heat along its entire length. Any known means could be used for providing heat to the heating tube. Carbon fuels may be used. Carbon fuels will efficiently achieve the 700° F. to 900° F. which is necessary to pyrolize the tires. In fact, the gas byproduct from the pyrolysis may be burned and used to heat the heating tube. Heating means and blowers 12 may be provided to force the heat into the heating tube.

An opening is provided on one end of the vessel through which the carriage is placed into the vessel and removed from the vessel. A door 10 is provided to cover the vessel and maintain the desired pressure within the vessel as the device is used. Any known means may be used for attaching, opening, closing and sealing the door. It is desired that the door be sealed as to allow pressure to be maintained within the vessel and to prevent the escape of gas in an undesired manner through the door. As shown, a series of nuts and bolts is used to attach the door, however, hydraulic or pneumatic closing means, or hinges, having seals which are adequate to seal the door, may be used.

Means is provided to control the pressure within the vessel. A pressure gauge may be affixed to an opening 14 in the device to monitor pressure. An opening 16 may be provided to allow gas to escape from the vessel as it is heated to maintain the pressure within the vessel within the desired range. Means may be provided to collect gas as it is allowed to escape from the vessel.

In use, the device is heated rapidly to an internal temperature of 700° F. to 900° F. A temperature gauge may be inserted into the vessel through an opening 18 to determine temperature. Heat is provided to the heating tube by the desired means, whether by burning of fuel, or by electrical means, nuclear means, or other known means of providing heat energy, as long as the temperature within the vessel can be rapidly brought to 700° F. to 900° F.

As the temperature within the vessel begins to rise, the pressure within the vessel will begin to rise. Once the pressure within the vessel achieves 100 to 300 p.s.i., pressure is regulated within the vessel by releasing gas. This gas is collected for subsequent use.

The rubber component of the tires yield solid, liquid and gas components. Tires commonly have steel and other components as well. However, as the tires are pyrolized, rubber yields the usable solid, liquid and gas fractions.

The solid, liquid and gas components which result may be used as fuels. Fuels containing high sulfur components are environmentally unsatisfactory. Since it has long been known to add sulfur to "vulcanize" the rubber for improved properties, the resulting fractions from the pyrolysis of tires as performed in the prior art may yield components having sulfur contents which are not satisfactory for use as fuels. However, the temperature and pressure ranges used in the present invention yield solid, liquid and gas components having satisfactory levels of sulfur when compared with similar materials from other sources.

In use, tires are placed with the carriage. It is desired that multiple tires be placed with the carriage. The diameter of the cross-section of the vessel should be large enough to accept the tires and the carriage, but not significantly larger than the diameter of the largest tire to be placed within the vessel. Vessels or carriages could be designed as needed for various tire diameters. Tires are placed in the carriage; it is not necessary to chop or cut the tires prior to placement with the carriage. It is desirable to place multiple tires with the carriage for optimal energy efficiency. The vessel may be of any length, but should be long enough to accept numerous tires. There is no particular limit to the length of the vessel, other than efficiency in placing and removing tires from the vessel. The heating tube, which traverses the interior of the vessel in a longitudinal fashion, provided heat at all points within the vessel so that the vessel may be virtually any length.

The tires are placed within the vessel with the center opening of the tires surrounding the heating tube. A door is placed over the opening of the vessel and fastened. Heat is supplied to the vessel through the heating tubes by the heating means. The internal temperature of the vessel is increased by the heating means and the heating tube to 700° F. to 900° F., and maintained at that temperature. It is desirable to bring the internal temperature to the desired range as quickly as possible. As the temperature rises, the internal pressure of the vessel will rise. By means of a pressure relief valve 17, pressure is maintained at 100 to 300 p.s.i. The pressure is released by allowing gas to escape from the vessel. This gas is collected. The temperature should be maintained until the rubber of the tires is substantially reduced to a solid and a liquid. Heat to the device is then terminated, and the vessel is allowed to cool.

The gas from the vessel has been collected into a suitable container for containing the gas. The liquid from the vessel, which is an oil, is removed from the container, as is the solid coke material.

While the makeup of all rubber is not identical, the following analysis is typical for the gas taken from the vessel during pyrolysis:

| COMPOUND | MOL % |
|---|---|
| Nitrogen | 21.218 |
| Oxygen | 5.227 |
| Carbon Monoxide | 3.788 |
| Carbon Dioxide | 5.410 |
| Methane | 48.888 |
| Ethane | 6.617 |
| Ethylene | 2.488 |
| Propane | 1.678 |
| Propylene | 0.580 |
| Isobutylene | 1.793 |
| 1,3-Butadiene | 0.131 |
| N-Butane | 0.133 |
| Trans-Butene-2 | 0.047 |
| Cis-Butene-2 | 0.101 |
| 3-Methyl-Butene-1 | 0.030 |
| Isopentane | 0.049 |
| Pentene-1 | 0.018 |
| 2-Methyl-Butene-1 | 0.102 |
| N-Pentane | 0.038 |
| Isoprene | 0.052 |
| Trans-pentene-2 | 0.020 |
| Cis-Pentene-2 | 0.010 |
| 2-Methyl-Butene-2 | 0.203 |
| Trans-1,3-Pentadiene | 0.006 |
| Cis-1,3-Pentadiene | 0.024 |
| Cyclopentene | 0.016 |
| Cyclopentane | 0.005 |
| 2-Methyl-1-Pentane | 0.003 |
| 3-Methyl-1-Pentane | 0.003 |
| 2-Methyl-pentene-1 | 0.003 |
| Hexene-1 | 0.003 |
| N-Hexane | 0.008 |
| C6 Olefins | 0.009 |
| 3-Methylcylcopentene-1 | 0.001 |
| Methylcylcopentane | 0.002 |
| C7 Olefins | 0.009 |
| Benzene | 0.110 |
| N-Heptane | 0.020 |

The total sulfur content is 9.0 parts per million. This gas may be used a fuel. The gas may be used a fuel to provide heat to the heating tube. The gas may be burned and used as a fuel in many applications.

The liquid, or oil, has a typical analysis as follows:

| | |
|---|---|
| Carbon | 85.33% |
| Hydrogen | 13.42% |
| Nitrogen | .21% |
| Sulfur | 1.04% |

This liquid is suitable use a fuel oil. The oil yields 17,668 BTU's per pound.

The solid, or coke, has a typical analysis with water removed as follows:

| | |
|---|---|
| Carbon | 83.89% |
| Hydrogen | 1.34% |
| Nitrogen | 0.75% |
| Sulfur | 2.47% |
| Ash | 11.28% |
| Oxygen | 0.32% |

The coke may be used a fuel. Coke may be burned and used where solid coke fuels are used.

The particular heat and temperature ranges used in conjunction with the method described above yield sold, liquid and as byproducts which may be used as fuels. These fuels have very desirable low sulfur qualities. The gas has an extremely low sulfur content of 9.0 parts per million, rendering the sulfur content of no significant consequence. The oil has a sulfur content of 1.04%, which compares very favorably with fuels which are currently available. When used a fuel oil, in many applications, it is not necessary to refine the oil produced by the process. Most of the sulfur from the rubber is deposited in the coke. Most coke is made from coal, and many grades of coal have relatively high sulfur levels. Resulting coke compares favorably with coke made from coal. If the coke levels are too high for the particular application, the coke could be processed to remove sulfur prior to burning.

The process yields usable byproducts. The particular range of pressure and temperatures result in a depositing of the sulfur in the coke. It is more desirable to deposit the sulfur in the coke, rather than in the oil or the gas.

What is claimed is:

1. A device for pyrolyzing tires, comprising:
   a. a vessel having an annular longitudinal void therein of a sufficient size for receiving and containing a plurality of tires, said vessel having an open end therein;
   b. a carriage shaped and dimensioned to contain a plurality of tires located within said carriage, wherein each of said tires has an annular void therein, and wherein each of said tires is positioned generally concentrically to a remainder of said tires to form a longitudinal tunnel through said plurality of tires, said carriage also to be contained within said void of said vessel;
   c. a central heating tube which extends from an end of said vessel which is opposite said open end of said vessel, wherein said heating tube extends longitudinally through said longitudinal void of said vessel and through said tunnel formed by said plurality of tires, to substantially said open end of said vessel, but not beyond said open end of said vessel, said heating tube having means for emitting heat along a length of said heating tube, and wherein, in use, a temperature is maintained within said vessel which is sufficient for pyrolizing said tires; and
   d. a door which is positioned over said open end of said vessel wherein said door is of a sufficient size to cover said open end of said vessel, and said open end of said vessel is of a sufficient size to allow insertion of said carriage having said plurality of tires located therein into said void of said vessel.

2. A device for pyrolyzing tires as described in claim 1, further comprising means for forcing heated air into said heating tube and into said vessel, 3. A device for pyrolyzing tires as described in claim 1, wherein said heating tube is positioned generally horizontally within said vessel.

4. A device for pyrolyzing tires as described in claim 2, wherein said heating tube is positioned generally horizontally within said vessel.

5. A device for pyrolyzing tires as described in claim 1, further comprising a pressure release means which communicates with said vessel.

6. A device for pyrolyzing tires as described in claim 2, further comprising a pressure release means which communicates with said vessel.

7. A device for pyrolyzing tires as described in claim 3, further comprising a pressure release means which communicates with said vessel.

8. A device for pyrolyzing tires as described in claim 4, further comprising a pressure release means which communicates with said vessel.

* * * * *